United States Patent
Shao et al.

(10) Patent No.: US 12,310,489 B2
(45) Date of Patent: May 27, 2025

(54) INTERDENTAL BRUSH WITH REPLACEABLE BRUSH BODY WITH CORE AND MANUFACTURING METHOD THEREOF

(71) Applicant: Taizhou University, Taizhou (CN)

(72) Inventors: Ling Shao, Jinhua (CN); Liu Zhu, Taizhou (CN); Mengliang Chen, Taizhou (CN); Kaice Yang, Taizhou (CN); Feilong Xu, Taizhou (CN); Weiwei Li, Taizhou (CN); Na Xue, Taizhou (CN); Yingqi Huang, Taizhou (CN)

(73) Assignee: Taizhou University, Taizhou (CN)

( * ) Notice: Subject to any disclaimer, the term of this patent is extended or adjusted under 35 U.S.C. 154(b) by 0 days.

(21) Appl. No.: 18/902,147

(22) Filed: Sep. 30, 2024

(65) Prior Publication Data
US 2025/0057306 A1 Feb. 20, 2025

Related U.S. Application Data

(63) Continuation of application No. PCT/CN2024/098228, filed on Jun. 7, 2024.

(30) Foreign Application Priority Data

Aug. 15, 2023 (CN) .......................... 202311024475.X

(51) Int. Cl.
A46B 5/00 (2006.01)
A46B 3/16 (2006.01)
(Continued)

(52) U.S. Cl.
CPC ............... *A46B 5/0095* (2013.01); *A46B 3/16* (2013.01); *A46B 9/026* (2013.01); *A46B 9/04* (2013.01);
(Continued)

(58) Field of Classification Search
CPC ............ A46B 5/0095; A46B 3/16; A46B 3/05
See application file for complete search history.

(56) References Cited

FOREIGN PATENT DOCUMENTS

CN 105919275 A * 9/2016
CN 106108360 A 11/2016
(Continued)

OTHER PUBLICATIONS

International Search Report and Written Opinion for PCT/CN2024/098228, dated Jun. 26, 2024.
ISR from the file PCT/CN2024/098228 dated Jun. 26, 2024.

*Primary Examiner* — Shay Karls
(74) *Attorney, Agent, or Firm* — Piloff Passino & Cosenza LLP; Rachel K. Piloff; Sean A. Passino

(57) ABSTRACT

An interdental brush with a replaceable brush body with a core and a manufacturing method thereof are provided, and relate to the technical field of tooth cleaning tools. The interdental brush includes a handle, a screw cap, a fixing block and a brush body. One end of the handle is provided with an external thread, an interior of the screw cap is provided with an internal thread mating with the external thread of the one end of the handle. One end of the fixing block abuts against the handle, and an other end extends out of the screw cap. The brush body includes a core and bristles, the core is twisted by an amorphous alloy wire, one end of the core is clamped in the fixing block, and a periphery of an other end is connected to the bristles.

3 Claims, 7 Drawing Sheets

(51) Int. Cl.
   *A46B 9/02* (2006.01)
   *A46B 9/04* (2006.01)
   *A46D 3/05* (2006.01)
   *B29C 45/00* (2006.01)
   *C22C 16/00* (2006.01)
   *C22C 30/02* (2006.01)
   *B29L 1/00* (2006.01)
   *B29L 31/42* (2006.01)

(52) U.S. Cl.
   CPC .............. *A46D 3/05* (2013.01); *B29C 45/006* (2013.01); *C22C 16/00* (2013.01); *C22C 30/02* (2013.01); *A46B 2200/108* (2013.01); *B29C 2045/0093* (2013.01); *B29K 2023/06* (2013.01); *B29L 2001/00* (2013.01); *B29L 2031/425* (2013.01); *C22C 2200/02* (2013.01)

(56) References Cited

FOREIGN PATENT DOCUMENTS

| | | | | |
|---|---|---|---|---|
| CN | 116965635 | A | 10/2023 | |
| JP | 3118045 | U | 1/2006 | |
| JP | 2010075261 | A | 4/2010 | |
| JP | 2021177800 | A | 11/2021 | |
| KR | 200443581 | Y1 * | 2/2009 | |
| KR | 20230051781 | A | 4/2023 | |
| NL | 2037307 | A | 4/2024 | |
| TH | 127597 | A * | 9/2013 | .............. A46B 3/18 |
| WO | 2010128591 | A1 | 11/2010 | |
| WO | 2019165504 | A1 | 9/2019 | |

\* cited by examiner

INTERDENTAL BRUSH WITH REPLACEABLE BRUSH BODY WITH CORE AND MANUFACTURING METHOD THEREOF

CROSS-REFERENCE TO RELATED APPLICATIONS

This application is a continuation of PCT/CN2024/098228, filed Jun. 7, 2024 and claims priority of Chinese Patent Application No. 202311024475.X, filed on Aug. 15, 2023, the entire contents of which are incorporated herein by reference.

TECHNICAL FIELD

The disclosure relates to the technical field of tooth cleaning, and in particular to an interdental brush with a replaceable brush body with a core and a manufacturing method thereof.

BACKGROUND

Toothbrush is an indispensable oral cleaning tool in our daily life. There are many kinds of toothbrushes in the market, which are divided into ordinary toothbrush, spray toothbrush, electric toothbrush, house-shaped toothbrush, single-headed toothbrush, and interdental brush, etc., according to different functions. The interdental brushes are used to remove impurities and dirt between teeth, which is beneficial to cleaning between teeth. A commonly known and used interdental brush is composed of a handle and a brush body formed by a thin metal wire that is bent and twisted, and bristles are implanted onto the metal wire. The brush body is generally cylindrical or conical, and the handle is generally made of synthetic resin, mostly cylindrical in size suitable for hand holding. The wire root of the brush body is usually fixed to the handle by insert molding and other physical bonding methods including high-frequency and ultrasonic thermal bonding, so that the brush body and the handle are integrated and the metal brush body may not be separated and replaced. At present, steel wire is often used as the metal wire of the core of the brush body of the interdental brush in the market. This kind of metal wire has general toughness, and it is very easy to damage the metal wire in a short time. After being used several times, the metal wire will break at the root of the brush body (that is, the joint between the brush body and the handle). As a result, the entire interdental brush becomes unusable, and the handle is not recyclable, making this type of brush both short-lived and not environmentally friendly.

Therefore, it is urgent to provide an interdental brush with a replaceable brush body with a core and a manufacturing method thereof.

SUMMARY

In view of this, the disclosure provides an interdental brush with a replaceable brush body with a core and a manufacturing method thereof, aiming at solving the problems in the prior art.

In order to achieve the above objective, the disclosure provides an interdental brush with a replaceable brush body with a core, including: a handle, a screw cap, a fixing block and a brush body. One end of the handle is provided with an external thread, and an interior of the screw cap is provided with an internal thread, and the external thread of the one end of the handle mates with the internal thread of the interior of the screw cap. One end of the fixing block abuts against the handle, and an other end extends out of the screw cap. The brush body includes a core and bristles, the core is twisted by an amorphous alloy wire, one end of the core is clamped in the fixing block, and a periphery of an other end is connected to the bristles.

In an embodiment, the one end of the handle has the external thread, and an outer surface of an other end has a concave-convex pattern.

In an embodiment, one end of the interior of the screw cap has an inclination, and an other end has the internal thread mating with the external thread of the one end of the handle.

In an embodiment, the core includes a free end and a fixing end connected with each other; the fixing end is clamped in the fixing block. The bristles are wound around the free end of the core and distributed radially.

In an embodiment, the fixing block includes two clamping blocks in left-right symmetrical arrangement, and is provided with a through hole in a center for fixing the fixing end of the core, and one end of an exterior has an inclined surface mating with the inclination of the one end of the interior of the screw cap.

In an embodiment, the amorphous alloy wire includes any one of $Zr_{49}Cu_{45}Al_6$ amorphous alloy wire, $Zr_{58}Cu_{22}Fe_8Al_{12}$ amorphous alloy wire, $Zr_{48}Cu_{36}Ag_8Al_8$ amorphous alloy wire, $Zr_{46.3}Cu_{43.4}Al_{8.3}Nb_2$ amorphous alloy wire, $Zr_{62.3}Cu_{22.5}Fe_{4.9}Al_{6.8}Ag_{3.5}$ amorphous alloy wire, $Ti_{40}Zr_{10}Cu_{40-x}Pd_{10+x}$ (x=0, 2, 4, 6, 8, 10) amorphous alloy wire, $Ti_{40}Zr_{10}Cu_{34}Pd_{14}Sn_2$ amorphous alloy wire, $Ti_{44}Zr_{10}Pd_{10}Cu_{6+x}Co_{23-x}Ta_7$ (x=0, 4, 8) amorphous alloy wire, $Ti_{47}Cu_{38-x}Zr_{7.5}Fe_{2.5}Sn_2Si_1Ag_2Nb_x$ (x=0, 1, 2) amorphous alloy wire, $Ti_{47}Cu_{38-x}Zr_{7.5}Fe_{2.5}Sn_2Si_1Ag_2Ta_x$ (x=1, 2, 3, 4) amorphous alloy wire and $Pd_{78}Si_{16}Cu_6$ amorphous alloy wire.

A manufacturing method of the interdental brush with the replaceable brush body with the core is provided, including following steps:

S1: spirally winding the amorphous alloy wire around a central axis to form the core, and radially implanting the bristles into the free end of the core by a hair-planting machine to form the brush body.

S2: injecting injection molding raw materials into a mold, and manufacturing the handle by an injection molding machine. The one end of the handle has the external thread, and the outer surface of the other end has the concave-convex pattern.

S3: injecting the injection molding raw materials into the mold, and manufacturing the screw cap by the injection molding machine. The one end of the interior of the screw cap has the inclination, and the other end has the internal thread mating with the external thread of the one end of the handle.

S4: injecting the injection molding raw materials into the mold, and manufacturing the fixing block by the injection molding machine. The fixing block includes two clamping blocks in left-right symmetrical arrangement, and is provided with the through hole in the center for fixing the fixing end of the core, and the one end of the exterior has the inclined surface mating with the inclination of the one end of the interior of the screw cap.

The disclosure has following beneficial effects.

The disclosure is simple in structure, convenient to manufacture, and environmental-friendly, which is suitable for popularization and application. The fixing end of the brush body is fastened to the end of the handle by the fixing block and the screw cap, so that the brush body broken during use may be replaced, and other parts may be recycled. The amorphous alloy wire has high strength and good toughness, and contains no harmful elements to human body, so it is not easy to break during use, which makes the interdental brush durable.

DETAILED DESCRIPTION OF THE EMBODIMENTS

Figure 1:
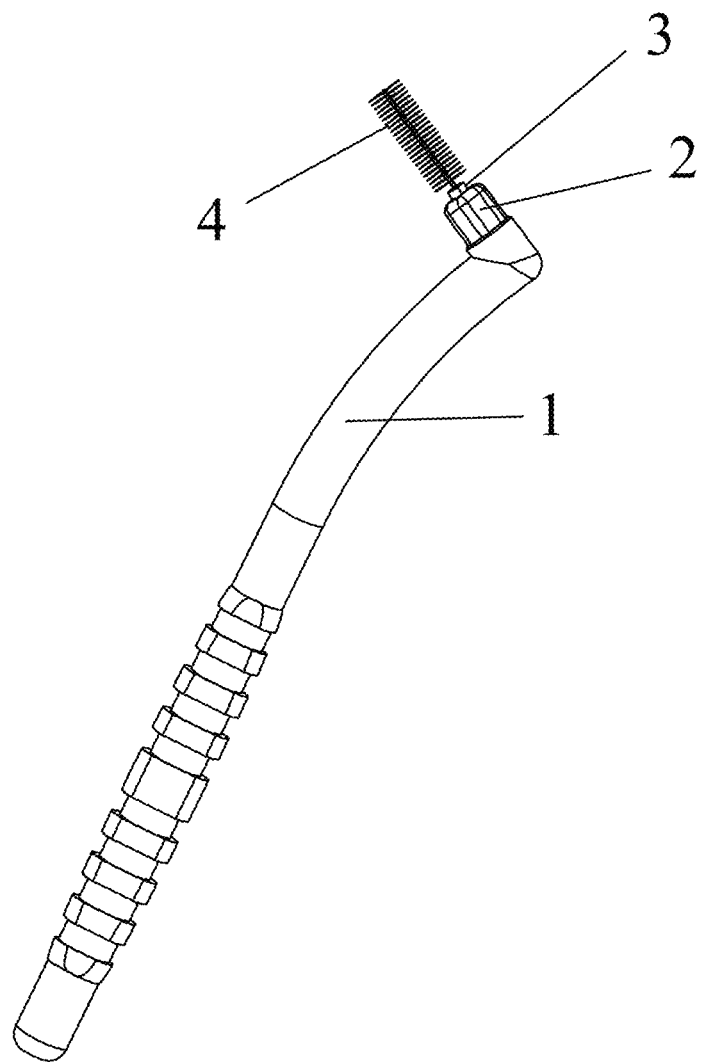
FIG. 1 is a schematic structural diagram of the disclosure.
Figure 2:
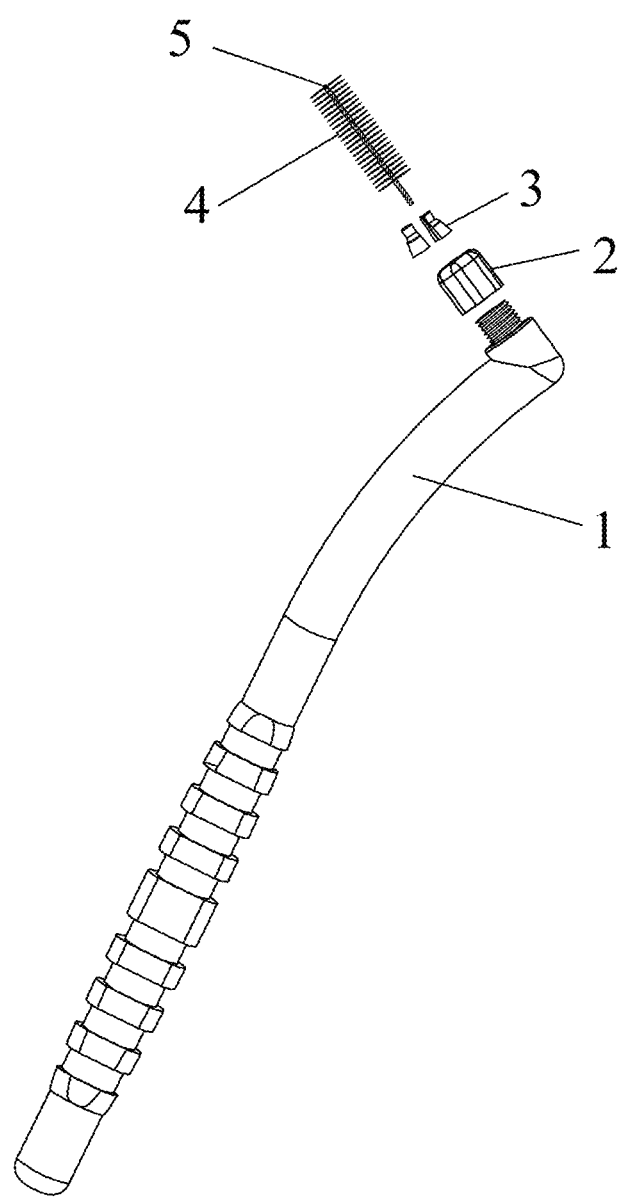
FIG. 2 is an exploded view of the disclosure.
Figure 3:
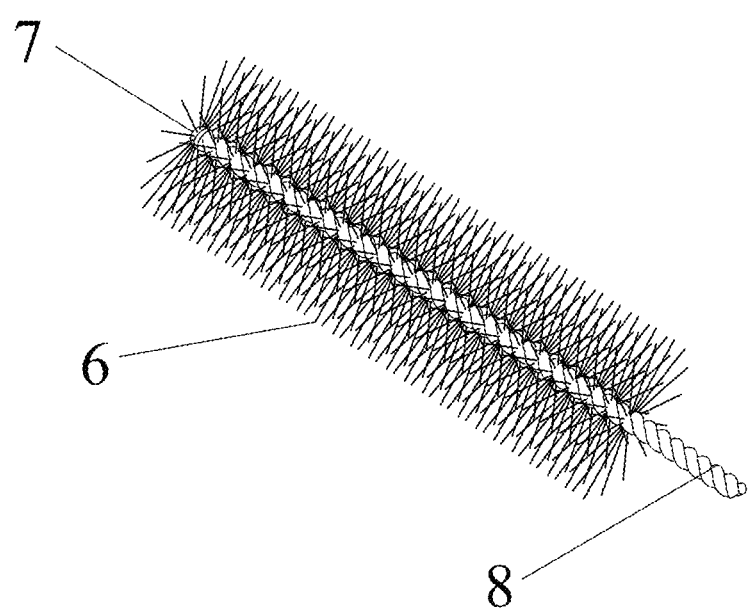
FIG. 3 is a schematic structural diagram of a brush body according to the disclosure.
Figure 4:
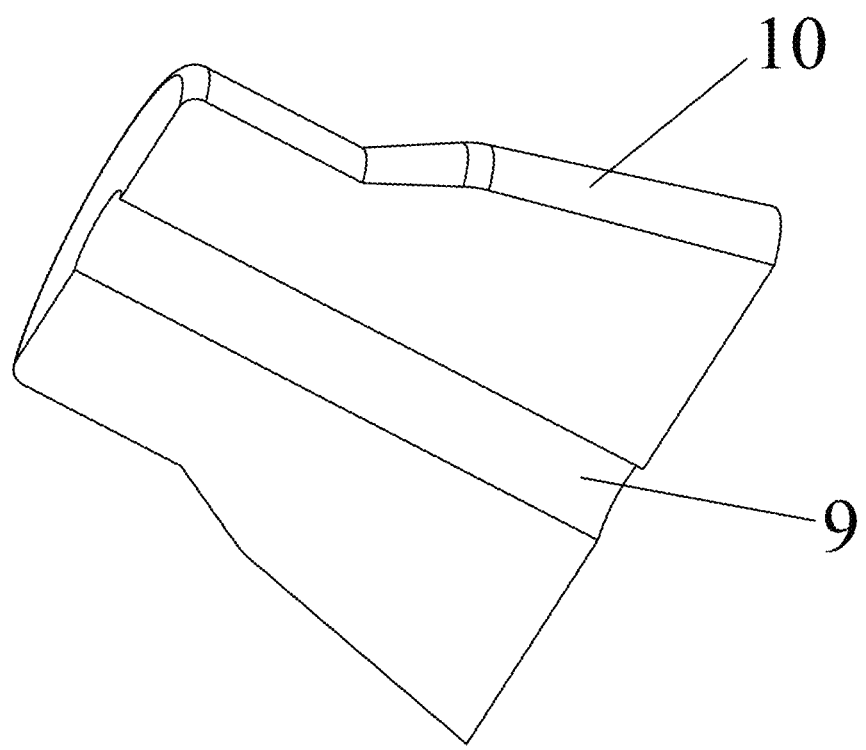
FIG. 4 is a schematic structural diagram of a fixing block according to the disclosure.
Figure 5:
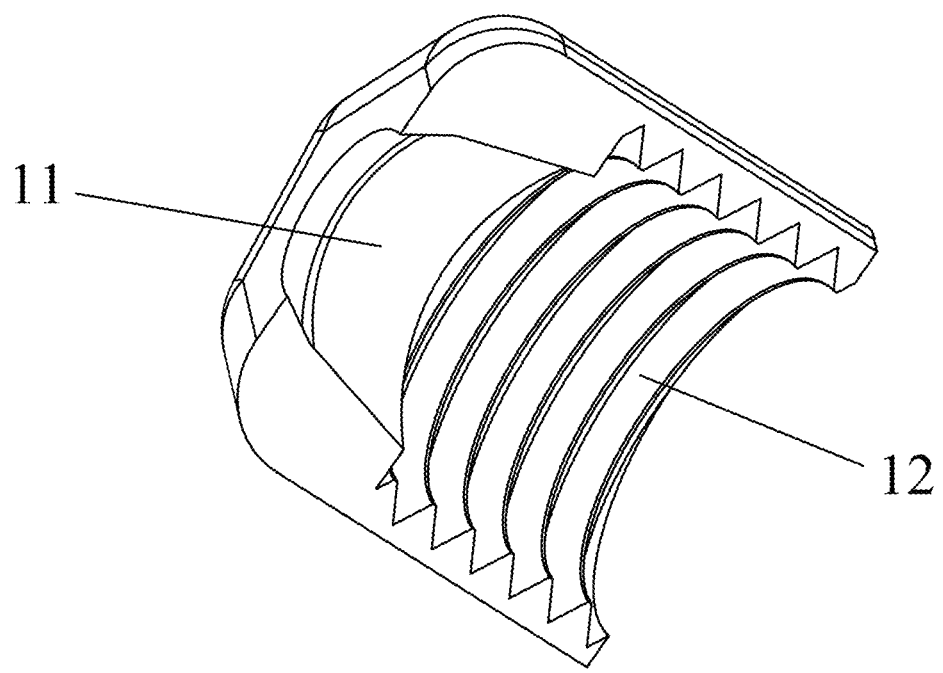
FIG. 5 is a schematic structural diagram of a screw cap according to the disclosure.
Figure 6:
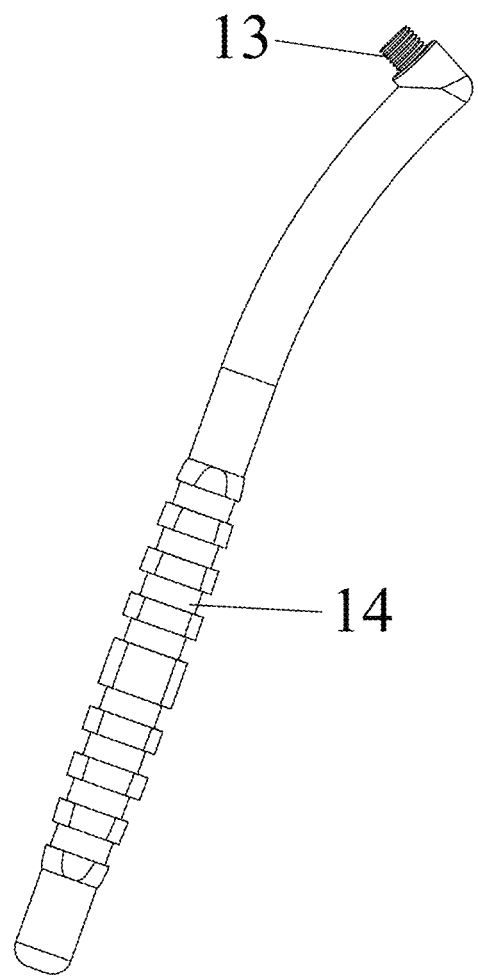
FIG. 6 is a schematic structural view of a handle according to the disclosure.

In order to achieve the above purpose and effect, the technical solution and construction adopted by the disclosure will be described in detail with reference to the attached drawings.

As shown in FIG. 1 to FIG. 6, the disclosure provides an interdental brush with a replaceable brush body with a core, which includes a handle 1, a screw cap 2, a fixing block 3 and a brush body 4. One end of the handle 1 is provided with an external thread 13, and the interior of the screw cap 2 is provided with an internal thread 12, and the external thread 13 of the one end of the handle 1 mates with the internal thread of the interior of the screw cap 2. One end of the fixing block 3 abuts against the handle 1, and the other end of the fixing block 3 extends out of the screw cap 2. The brush body 4 includes a core 5 and bristles 6, the core 5 is twisted by the amorphous alloy wire, one end of the core 5 is clamped in the fixing block 3, and a periphery of the other end of the core 5 is connected to the bristles 6.

In this embodiment, the handle 1 is substantially L-shaped, and the handle 1 is made of polyethylene PE. Polyethylene is relatively soft, with a waxy feel, and is lighter in weight compared to similar plastic. When the handle is made of polyethylene, the softness, comfort, pressure resistance and toughness of the handle are improved. When a user holds the handle, the handle is not easy to break, which makes the interdental brush durable. In addition, the anti-slip performance of the handle is enhanced, making it less likely for the interdental brush to slip from the user's hand when brushing teeth with the interdental brush. When the handle is L-shaped, there is a certain angle between the brush body and the handle, which is convenient for cleaning the impurities and dirt in the teeth.

In this embodiment, the one end of the handle 1 has the external thread 13, and an outer surface of the other end of the handle 1 has a concave-convex pattern 14. On the one hand, the concave-convex pattern on the outer surface of the handle increases the friction force on the surface of the handle, and further enhances the anti-slip performance of the handle, so that when user holds the handle to brush the teeth, the handle is not easy to fall off to the ground, and the interdental brush is prevented from being broken. On the other hand, the arrangement of the concave-convex pattern improves the comfort when consumer holds the handle.

In this embodiment, the core 5 includes a free end 7 and a fixing end 8 connected with each other; the fixing end 8 is clamped in the fixing block 3, and the bristles 6 are wound around the free end 7 of the core 5 and distributed radially. Because the free end of the core of the brush body is provided with bristles distributed radially, the bristles may effectively clean the stains between teeth in all directions.

One end of the interior of the screw cap 2 has an inclined surface and the inclined surface has an inclination 11, and the other end of the interior of the screw cap 2 has the internal thread 12 mating with the external thread 13 at the one end of the handle 1. The fixing block 3 includes two clamping blocks in left-right symmetrical arrangement, and is provided with a through hole 9 in a center for fixing the fixing end 8 of the core 5, and one end of the exterior of the fixing block 3 has an inclined surface 10 which mates with the inclination 11 of the end of the interior of the screw cap 2. A traditional interdental brush integrates the brush body and the handle in the injection molding process. Once the brush body is broken during use, the whole interdental brush will be unusable. The interdental brush of the disclosure breaks through the traditional manufacturing method of interdental brush, and the fixing end of the core of the brush body is fastened to the end of the handle by the fixing block and the screw cap, so that the brush body broken during use may be replaced, and other parts may be recycled.

In this embodiment, the amorphous alloy wire includes any one of $Zr_{49}Cu_{45}Al_6$ amorphous alloy wire, $Zr_{58}Cu_{22}Fe_8Al_{12}$ amorphous alloy wire, $Zr_{48}Cu_{36}Ag_8Al_8$ amorphous alloy wire, $Zr_{46.3}Cu_{43.4}Al_{8.3}Nb_2$ amorphous alloy wire, $Zr_{62.3}Cu_{22.5}Fe_{4.9}Al_{6.8}Ag_{3.5}$ amorphous alloy wire, $Ti_{40}Zr_{10}Cu_{40-x}Pd_{10+x}$ (x=0, 2, 4, 6, 8, 10) amorphous alloy wire, $Ti_{40}Zr_{10}Cu_{34}Pd_{14}Sn_2$ amorphous alloy wire, $Ti_{44}Zr_{10}Pd_{10}Cu_{6+x}Co_{23-x}Ta_7$ (x=0, 4, 8) amorphous alloy wire, $Ti_{47}Cu_{38-x}Zr_{7.5}Fe_{2.5}Sn_2Si_1Ag_2Nb_x$ (x=0, 1, 2) amorphous alloy wire, $Ti_{47}Cu_{38-x}Zr_{7.5}Fe_{2.5}Sn_2Si_1Ag_2Ta_x$ (x=1, 2, 3, 4) amorphous alloy wire and $Pd_{78}Si_{16}Cu_6$ amorphous alloy wire. Such amorphous alloy wire has high strength and good toughness, and contains no harmful elements to human body, and it is not easy to break during use, thus making the interdental brush durable.

Figure 7:
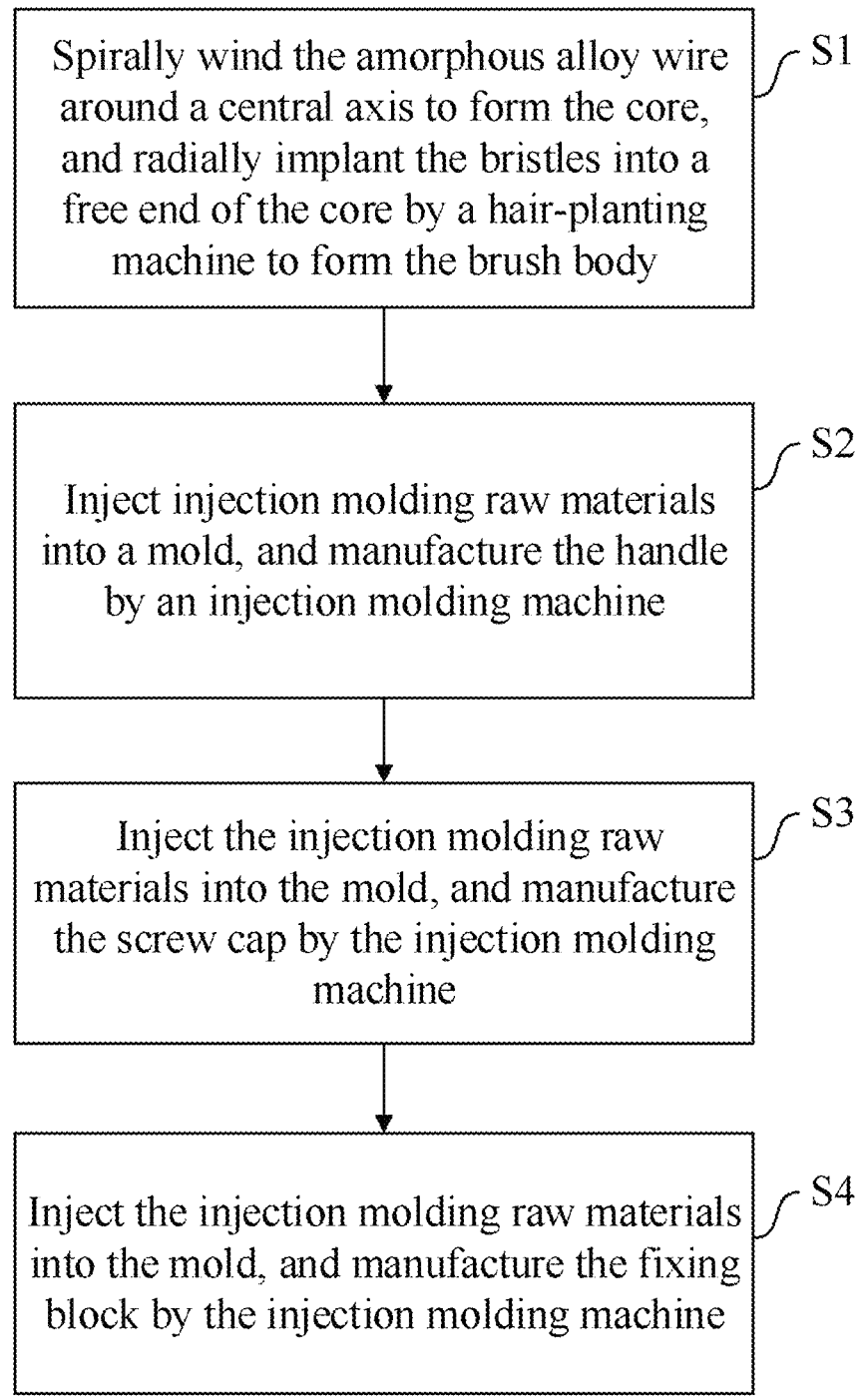
FIG. 7 is a flowchart of a manufacturing method of an interdental brush according to the disclosure.

The disclosure further provides a manufacturing method of the interdental brush with the replaceable brush body with the core, as shown in FIG. 7, which includes the following steps:

S1: the amorphous alloy wire is spirally wound around the central axis thereof to form the core 5. The bristles 6 are radially implanted into the free end 7 of the core 5 by a hair-planting machine to form the brush body 4, therefore, the stains between teeth may be effectively cleaned by the bristles in all directions.

S2: injection molding raw materials are injected into a mold, and the handle 1 is manufactured by an injection molding machine. The one end of the handle 1 is provided with the external thread 13, and the outer surface of the other end of the handle 1 is provided with the concave-convex pattern 14.

S3: injection molding raw materials are injected into a mold, and the screw cap 2 is manufactured by the injection molding machine. The one end of the interior of the screw cap 2 has the inclination 11, and the other end of the interior of the screw cap 2 has the internal thread 12 mating with the external thread 13 of the one end of the handle 1.

S4: injection molding raw materials are injected into a mold, and the fixing block 3 is manufactured by the injection molding machine. The fixing block 3 includes two clamping blocks which are in left-right symmetrical arrangement, and the fixing block 3 is provided with the through hole 9 in the center of the fixing block 3 for fixing the fixing end 8 of the core 5. The one end of the exterior of the fixing block 3 has the inclined surface 10, and the inclined surface 10 mates with the inclination 11 of the one end of the interior of the screw cap 2.

The above is only the preferred embodiment of the disclosure, and it does not limit the technical scope of the disclosure. Therefore, any slight modification, equivalent change and modification of the above embodiment according to the technical essence of the disclosure still falls within the scope of the technical scheme of the disclosure.

What is claimed is:

1. An interdental brush with a replaceable brush body with a core, comprising: a handle, a screw cap, a fixing block and a brush body, wherein one end of the handle is provided with an external thread, an interior of the screw cap is provided with an internal thread, and the external thread of the one end of the handle mates with the internal thread of the interior the screw cap; one end of the fixing block abuts against the handle, and an other end extends out of the screw cap; and the brush body comprises a core and bristles, wherein the core is twisted by an amorphous alloy wire, one end of the core is clamped in the fixing block, and a periphery of an other end is connected to the bristles;

wherein one end of the interior of the screw cap has an inclination, and another end has the internal thread mating with the external thread of the one end of the handle;

wherein the core comprises a free end and a fixing end connected with each other; the fixing end is clamped in the fixing block; and the bristles are wound around the free end of the core and distributed radially; and wherein the fixing block comprises two clamping blocks in left-right symmetrical arrangement, and is provided with a through hole in a center for fixing the fixing end of the core, and one end of an exterior has an inclined surface mating with the inclination of the one end of the interior of the screw cap.

2. The interdental brush with the replaceable brush body with the core according to claim 1, wherein the one end of the handle has the external thread, and an outer surface of an other end has a concave-convex pattern.

3. A manufacturing method of the interdental brush with the replaceable brush body with the core according to claim 1, comprising following steps:

S1: spirally winding the amorphous alloy wire around a central axis to form the core, and radially implanting the bristles into the free end of the core by a hair-planting machine to form the brush body;

S2: injecting injection molding raw materials into a mold, and manufacturing the handle by an injection molding machine, wherein the one end of the handle has the external thread, and an outer surface of an other end has a concave-convex pattern;

S3: injecting the injection molding raw materials into the mold, and manufacturing the screw cap by the injection molding machine; and S4: injecting the injection molding raw materials into the mold, and manufacturing the fixing block by the injection molding machine.

\* \* \* \* \*